United States Patent [19]
Campbell

[11] 3,757,367
[45] Sept. 11, 1973

[54] METHOD FOR CARBON DIOXIDE SNOW SEPARATION

[75] Inventor: Ronald F. Campbell, Oak Lawn, Ill.

[73] Assignee: Chemetron Corporation, Chicago, Ill.

[22] Filed: Feb. 8, 1971

[21] Appl. No.: 113,489

[52] U.S. Cl................... 62/10, 62/12, 55/461
[51] Int. Cl.................. F25j 1/00, F25j 3/00
[58] Field of Search ............ 62/9, 10, 11, 12, 62/13; 55/461

[56] References Cited
UNITED STATES PATENTS

| | | | |
|---|---|---|---|
| 2,929,112 | 3/1960 | Massey | 55/461 |
| 3,528,221 | 9/1970 | Garrett | 55/461 |
| 1,382,846 | 6/1921 | Merrill | 55/461 |
| 1,546,682 | 7/1925 | Slate | 62/10 |
| 1,870,691 | 8/1932 | Rust | 62/10 |

*Primary Examiner*—Norman Yudkoff
*Assistant Examiner*—A. F. Purcell
*Attorney*—Nicholas M. Esser

[57] ABSTRACT

Improved method and apparatus for separating carbon dioxide snow from a mixture of carbon dioxide snow and vapor, without reference to gravity, in order to deliver carbon dioxide snow and vapor each at a substantial rate of flow.

16 Claims, 5 Drawing Figures

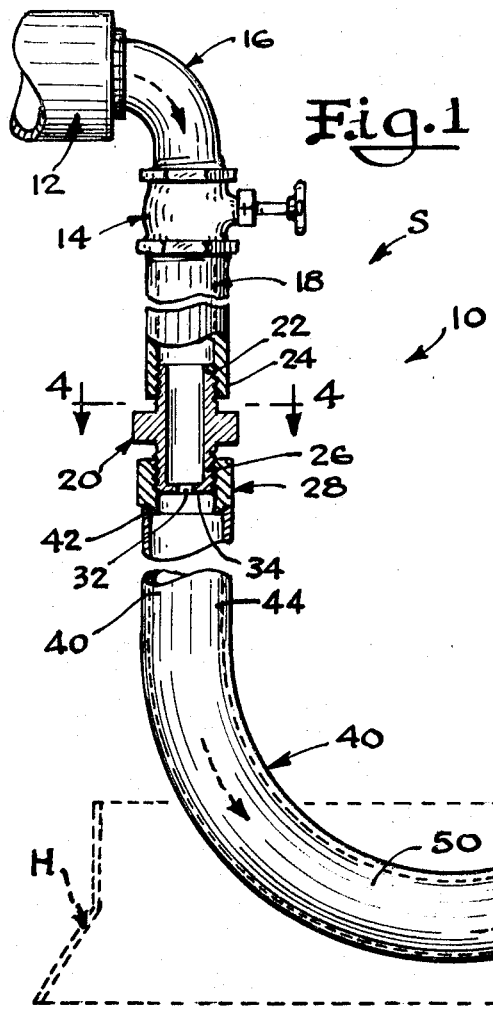

METHOD FOR CARBON DIOXIDE SNOW SEPARATION

BACKGROUND OF THE INVENTION

This invention pertains to an improved method and improved apparatus for separating carbon dioxide snow from a mixture of carbon dioxide snow and vapor.

When liquefied carbon dioxide flows through a restriction in a conduit such that the pressure of the liquefied carbon dioxide is reduced from a pressure above the triple point pressure (approximately 75 psia) to a pressure below the triple point pressure, the liquefied carbon dioxide is converted to a mixture of snow and vapor. In many practical applications, as where carbon dioxide snow is to be employed as a refrigerating medium and carbon dioxide vapor is to be recovered and removed from the presence of operating personnel or recycled, it is necessary to separate carbon dioxide snow from the mixture.

By way of background, known apparatus of the "cyclone" type for separating particulate matter from gaseous matter has been used for separating carbon dioxide snow from a mixture of carbon dioxide snow and vapor. For example, see U.S. Pat. No. 1,546,682. In such apparatus, in which the mixture is injected generally tangentially through an opening in the lateral wall of an upright chamber, carbon dioxide snow is separated from the mixture through the combined actions of centrifugal force and gravity and thus settles toward the bottom of the chamber, and carbon dioxide vapor is drawn off through an opening in the top of the chamber. Thus, such apparatus relies upon gravity for separation of carbon dioxide from such a mixture.

According to well known principles, once any object or material has been set in motion, the force required to deflect the object or material from motion in a straight line depends upon the velocity and the density of the object or material being deflected. In a flowing mixture of carbon dioxide snow and vapor, in which the snow is many times denser than the vapor and in which the velocities of the snow and the vapor are similar, the snow offers more resistance to a deflecting force. Thus, where the deflecting force is provided by a curved surface along which the mixture flows, the snow tends to move under centrifugal force to the outer side of the curvilinear flow path bounded by the curved surface and to displace the vapor away from the curved surface. In the prior art, these principles have been applied to separation of carbon dioxide snow from a mixture of carbon dioxide snow and vapor for controlled discharge of carbon dioxide snow and vapor from fire extinguishing nozzles and similar apparatus. For example, see U.S. Pat. Nos. 2,322,758, 2,357,039, and 2,387,935. In such apparatus, vapor and snow are discharged together, and no provision is made for recovery of vapor.

Herein, the efficiency of recovery of carbon dioxide snow from liquefied carbon dioxide flashed to a mixture of carbon dioxide snow and vapor is defined as the percent by weight of the total liquefied carbon dioxide flashed which is recovered as solid. For example, where carbon dioxide snow is recovered at a rate of 30 pounds per minute from liquefied carbon dioxide flashed at a rate of 100 pounds per minute, the efficiency is 30 percent. In such an example, the theoretical efficiency depends upon the temperature and pressure of liquefied carbon dioxide flashed and by way of example would be approximately 48 percent for saturated liquefied carbon dioxide under a source pressure of 238 psig.

It has been observed that particles of carbon dioxide snow may assume either a flaky form or a granular form. Particles of carbon dioxide snow in a flaky form, which have more surface area and thus tend to meet more resistance to movement through the atmosphere, may be better suited to some practical applications, as where carbon dioxide snow is to be packed gently around fragile items such as foodstuffs. Particles of carbon dioxide snow in a granular form, which have less surface area and thus tend to meet less resistance to movement through the atmosphere, may be better suited to other practical applications, as where carbon dioxide snow is to be projected over a substantial distance. It has been found that the method and apparatus of this invention may be applied both to practical applications where particles of carbon dioxide snow in a flaky form are useful and to practical applications where particles of carbon dioxide snow in a granular form are useful.

Reference may be made to U.S. Pat. Nos. 3,320,075 and 3,498,799. These patents exemplify uses of carbon dioxide snow as a refrigerating medium and suggest typical settings for applications of the method and apparatus of this invention.

Reference also may be made to U.S. Pat. No. 2,988,898. This patent, which generally pertains to conversion of liquefied carbon dioxide to a mixture of carbon dioxide snow and vapor, discloses a process useful in applications of the method and apparatus of this invention whereby the pressure in a tubular conduit just downstream of an orifice through which liquefied carbon dioxide is flashed should be maintained between 5 and 60 psig for flow of the resultant mixture of carbon dioxide snow and vapor through the tubular conduit.

From the foregoing, it is concluded that there remains a need for a method and apparatus for efficiently separating carbon dioxide snow from a mixture of carbon dioxide snow and vapor, without reference to gravity, for delivery of carbon dioxide snow at a substantial rate of flow with provision for recovery of vapor at a substantial rate of flow.

SUMMARY OF THE INVENTION

Broadly, this invention contemplates flowing a mixture of carbon dioxide snow and vapor along a curvilinear surface such that carbon dioxide snow is concentrated along the curvilinear surface by application of centrifugal force and dividing concentrated carbon dioxide snow from the remainder of the mixture for withdrawal across a margin of the curvilinear surface. Accordingly, it has been found that highly efficient separation of carbon dioxide snow from a mixture of carbon dioxide snow and vapor may be attained.

Thus, this invention provides a highly efficient method and apparatus for separating carbon dioxide snow from a mixture of carbon dioxide snow and vapor, without reference to gravity, for delivery of snow at a substantial rate of flow with provision for recovery of vapor at a substantial rate of flow.

In accordance with the principles of this invention, these objects may be attained in apparatus comprising a tubular conduit having an inlet end and an outlet end, means for introducing a mixture of carbon dioxide snow and vapor into the conduit for flow from the inlet end toward the outlet end, at least a portion of the conduit between the inlet end and the outlet end being curved to define a curvilinear flow path for the mixture such that carbon dioxide snow tends to be concentrated for flow in a concentrated stream through the curvilinear flow path, and deflecting means for deflecting a portion of the mixture for flow through an orifice in the lateral wall of the conduit. Preferably, the deflecting means comprises a blade positioned to deflect the concentrated stream of carbon dioxide snow through the orifice, and the orifice is located in the lateral wall of the curved portion of the conduit and opens radially outwardly. Additional features of the apparatus may comprise means for applying back pressure to the conduit and means for defrosting the blade. Also, the apparatus may be combined with flashing means for flashing liquefied carbon dioxide to introduce a mixture of carbon dioxide snow and vapor into the conduit for flow from the inlet end toward the outlet end.

Similarly, these objects may be attained in a method comprising the steps of flowing a mixture of carbon dioxide snow and vapor through a tubular conduit defining a curvilinear flow path such that carbon dioxide snow tends to be concentrated for flow in a concentrated stream and dividing the concentrated stream of carbon dioxide snow from the remainder of the mixture. Preferably, the concentrated stream of carbon dioxide snow is deflected for flow radially outwardly along a flow path intersecting the curvilinear flow path. The method may comprise the additional step of applying back pressure to the curvilinear flow path. Also, the method may comprise the additional step of flashing liquefied carbon dioxide to introduce a mixture of carbon dioxide snow and vapor into the curvilinear flow path.

Other objects of this invention are to increase the efficiency of recovery of carbon dioxide snow by controlled application of back pressure and to control production of granular particles of carbon dioxide snow by control of the rate at which liquefied carbon dioxide is flashed.

These and other objects, features and advantages of this invention should be evident from the following description, with the aid of the accompanying drawing, of a preferred embodiment of this invention.

BRIEF DESCRIPTION OF THE DRAWING

In the drawing:

FIG. 1 is an elevational view, partly in cross-section, showing apparatus embodying this invention as included in a system for delivering carbon dioxide snow for use as a refrigerating medium;

FIG. 2 is an elevational view taken substantially along line 2—2 of FIG. 1;

FIG. 3 is a fragmentary view, on an enlarged scale, showing a detail of the apparatus of FIG. 1;

FIG. 4 is a sectional view, taken substantially along line 4—4 of FIG. 1; and

FIG. 5 is a fragmentary view, somewhat similar to FIG. 3, showing a detail of a modification of the apparatus of FIG. 1.

DESCRIPTION OF THE PREFERRED EMBODIMENT

In FIG. 1, apparatus 10 embodying this invention for separating carbon dioxide snow from a mixture of carbon dioxide snow and vapor is shown as included in a system S for delivering carbon dioxide snow for uses as a refrigerating medium. As shown, a box B containing perishable foodstuffs or the like is supported by means of a conveyor C for movement beneath a hood H shielding the apparatus 10. Uses of carbon dioxide snow as a refrigerating medium are well known and are exemplified in the aforementioned U.S. Pat. Nos. 3,320,075 and 3,498,799.

The system S also includes a source 12 of liquefied carbon dioxide, a conventional ball valve 14 connected and arranged to control the flow of liquefied carbon dioxide from the source 12 to the apparatus 10 through a tubular conduit 16 leading from the source 12 to the valve 14 and through a tubular conduit 18 leading from the valve 14 to the apparatus 10, and an orifice nozzle 20 connected between the tubular conduit 18 and the apparatus 10. As shown, the inlet end 22 of the orifice nozzle 20 is externally threaded for threaded connection to an internally threaded end portion 24 of the tubular conduit 18, and the outlet end 26 of the orifice nozzle 20 similarly is externally threaded for threaded connection to an internally threaded coupling 28.

As shown, the outlet end 26 of the orifice nozzle 20 includes an orifice plate 30, which has an orifice 32 drilled or otherwise formed therein to define a restricted passageway for liquefied carbon dioxide flowing from the source 12 to the apparatus 10 through the orifice nozzle 20. Accordingly, as is well known, the pressure of the liquefied carbon dioxide may be reduced from a pressure above the triple point pressure (approximately 75 psia) to a pressure below the triple point pressure such that the liquefied carbon dioxide is converted to a mixture of carbon dioxide snow and vapor.

The apparatus 10, which is supported generally within the hood H of the system S, generally comprises a tubular conduit 40. As shown, the tubular conduit 40 has an inlet end 42, which is adapted to receive a mixture of carbon dioxide snow and vapor for flow through the tubular conduit 40, and an elongated straight inlet end portion 44, which includes the inlet end 42. As shown, the coupling 28 is is brazed or otherwise suitably mounted to the inlet end 42 of the tubular conduit 40. The tubular conduit 40 further has an outlet end 46, which is adapted to discharge a portion of the mixture flowing through the tubular conduit 40, an elongated straight outlet end portion 48, which includes the outlet end 46, and an elongated curved portion 50 between the inlet end portion 44 and the outlet end portion 48. The apparatus 10 further generally comprises means 52 for deflecting a portion of the mixture for flow through an orifice 54 in the lateral wall 56 of the curved portion 50 of the tubular conduit 40.

By application of the process disclosed in the aforementioned U.S. Pat. No. 3,988,898, the size of the orifice 32 should be regulated such that the pressure within the inlet end portion 44 of the tubular conduit 40 is maintained between 5 and 60 psig. Thus, the carbon dioxide vapor in the tubular conduit 40 will flow at a velocity sufficient to keep the accompanying carbon dioxide snow in suspension for flow through the tubular conduit 40.

In order to minimize the length of the curved portion 50 of the tubular conduit 40 necessary for efficient concentration of carbon dioxide snow, the inlet end portion 44 of the tubular conduit 40 should be elongated to permit the mixture to fill the cross-section of the tubular conduit 40 before entering the curved portion 50 of the tubular conduit 40. As shown, the length of the inlet end portion 44 of the tubular conduit 40 is approximately one-fourth of the overall length of the tubular conduit 40.

According to the previously mentioned well known principles, once any object or material has been set in motion, the force required to deflect the object or material from motion in a straight line depends upon the velocity and the density of the object or material being deflected, and, where the deflecting force is provided by a curved surface along which the mixture flows, the denser snow tends to move along the curvilinear flow path bounded by the curved surface and to displace the less dense vapor away from the curved surface. In the apparatus 10, the curved portion 50 of the tubular conduit 40 defines a curvilinear flow path of generally uniform tubular cross-section for the flowing mixture of carbon dioxide snow and vapor. Thus, by application of these principles, the snow tends to move under centrifugal force to the outer side of the curvilinear flow path and to displace the vapor away from an outer portion 58 of the lateral wall 56 of the curved portion 50 of the tubular conduit 40. Accordingly, the snow tends to be concentrated for flow in a concentrated stream in the curved portion 56 of the tubular conduit 40. In order to promote concentration of the snow, the curved portion 50 of the tubular conduit 40 should define an arcuate flow path extending over approximately from 90° to 180° of arc.

As shown, the orifice 54, which opens radially outwardly, is located in the curved portion 50 of the tubular conduit 40, and the deflecting means 52, which comprises a blade 60 brazed or otherwise suitably mounted to the lateral wall 56 of the tubular conduit 40 at a downstream margin 62 of the opening 54, is positioned to divide the concentrated stream of carbon dioxide snow from the remainder of the mixture and to deflect the concentrated stream of carbon dioxide snow through the opening 54 along a flow path intersecting the curvilinear path defined by the curved portion 50 of the tubular conduit 40. For convenience in mounting the blade 60, as shown, the tubular conduit 40 may be made in two sections, 40a and 40b, respectively, brazed or otherwise suitably joined together at a connection between a flange 64a on the section 40a and a flange 64b on the section 40b. As shown, the blade 60 is generally in the form of one half-section of a tube, and the leading edge 66 of the blade 60 is knife-edged.

Since there is a tendency for water vapor from the atmosphere to form frost on the blade 60, particularly when the apparatus has been shut down after use, it is useful for the apparatus 10 further to comprise means 70 for defrosting the blade 60. As shown in FIG. 1, the defrosting means 70 may be in the form of an electrical resistance heater 72 externally mounted to the blade 60.

As explained hereinafter, it is useful for the pressure within the tubular conduit 40 to be maintained above atmospheric pressure, Accordingly, the apparatus 10 further comprises means 74 for applying back pressure to the tubular conduit 40. As shown, an externally threaded coupling 76 is brazed or otherwise suitably mounted to the outlet end 46 of the tubular conduit 40, and the means 74 is in the form of a reducing bushing 78. The inlet end 80 of the reducing bushing 78 is internally threaded for threaded connection to the coupling 76. The outlet end 82 of the reducing bushing 78 is of reduced internal diameter relative to the inlet end 80 and is internally threaded for threaded connection to the threaded end 84 of a tubular conduit 86. The tubular conduit 86 permits carbon dioxide vapor to be drawn off and recycled or otherwise directed to a point of use. Where carbon dioxide vapor merely needs to be vented, the tubular conduit 86 may be omitted.

Controlled application of back pressure to the tubular conduit 40 maintains the pressure within the tubular conduit 40 above atmospheric pressure and has been found to significantly increase the efficiency of recovery of carbon dioxide snow. Where it is believed that an efficiency of 33 percent ordinarily would be considered favorable, efficiencies greater than 38 percent may be obtained with the apparatus 10.

In order to take full advantage of the length of the curved portion 50, the blade 60 should be positioned near the junction of the curved portion 50 and the outlet end portion 48. However, in order to avoid any substantial recombination of the concentrated stream of snow with the remainder of the mixture, the blade 60 should not be positioned immediately at the junction of the curved portion 50 and the outlet end portion 48. It has been observed that the concentrated stream of carbon dioxide snow assumes the form of thin narrow ribbon while flowing through the curved portion 50 of the tubular conduit 40. Thus, in order to minimize the amount of carbon dioxide vapor discharged through the orifice 54, the blade 60 may be positioned with its leading edge 66 extended only a slight distance into the tubular conduit 40, as shown in FIGS. 1 and 3.

The apparatus 10 efficiently separates carbon dioxide snow from a mixture of carbon dioxide snow and vapor without reference to gravity. Of course, as in the system S, gravity may be used to assist the delivery of separated carbon dioxide snow to a point of use. The apparatus 10, which delivers carbon dioxide snow, through the orifice 54 at a substantial rate of flow, also provides for recovery of carbon dioxide vapor through the outlet end 46 of the tubular conduit 40 at a substantial rate of flow. Thus, the recovered carbon dioxide vapor may be recycled to liquefied carbon dioxide.

An apparatus substantially as described in the preceding paragraph was constructed with a tubular conduit of 1.25 inch O.D., 0.065 inch wall, stainless steel tubing, 24 inches long. Both the straight inlet end portion of the tubular conduit and the straight outlet end portion of the tubular conduit were 6.125 inches long. The curved portion of the tubular conduit defined an arcuate flow path for the mixture extending over 180 degrees of arc. The radius of curvature of the curved portion of the tubular conduit, when measured to the central axis of the tubular conduit, was 3.75 inches long. The blade was formed from a half-section of similar tubing and was positioned with its leading edge at 21 degrees of arc from the junction of the curved and outlet end portions of the tubular conduit and thus at 159° of arc from the junction of the curved and inlet end portions of the tubular conduit. Reducing bushings of varying internal diameters were used to apply varying back pressures to the tubular conduit. The apparatus was operated at ambient temperatures.

In a first series of tests utilizing the apparatus described in the preceding paragraph, the efficiency in terms of the weight of carbon dioxide snow recovered as divided by the weight of liquefied carbon dioxide flashed was noted for various back pressures applied to the tubular conduit. The flowing results were noted:

EFFICIENCY

| Test | Tank (Source) Pressure | Liq. Rate | Snow Discharge Rate | %lb. Snow/ lb. Liq. |
|---|---|---|---|---|
| 1 | 236 psig | 73½ lb./min. | 21.3 lb./min. | 29% |
| 2 | 240 psig | 68½ lb./min. | 22.8 lb./min. | 33.3% |
| 3 | 236 psig | 70 lb./min. | 23.3 lb./min. | 33.3% |
| 4 | 236 psig | 70 lb./min. | 24 lb./min. (20 psig back pressure) | 34.3% |
| 5 | 238 psig | 70 lb./min. | 26 lb./min. (10 psig back pressure) | 37.1% |
| 6 | 238 psig | 70 lb./min. | 26.7 lb./min. (7 psig back pressure) | 38.1% |
| 7 | 238 psig | 73.3 lb./min. | 28 lb./min. (slight back pressure) | 38.2% |

NOTE: For saturated liquefied carbon dioxide under a pressure of 238 psig at the source, the theoretical efficiency would be approximately 48 percent. It is believed that an efficiency of 33 percent ordinarily would be considered favorable by those skilled in the art.

From these results, it has been noted that a back pressure of 20 psig or less increased the efficiency of recovery of carbon dioxide snow, and that back pressures of 10 or less psig provided efficiencies greater than the efficiency provided by a back pressure of 20 psig. Accordingly, it has been found that the efficiency may be increased by controlled application of back pressure to maintain the pressure within the tubular conduit above atmospheric pressure.

In a second series of tests of utilizing the same apparatus, the appearance of granular particles of carbon dioxide snow among flaky particles of carbon dioxide snow was related to the rate of discharge of carbon dioxide snow (as determined by the rate at which liquefied carbon dioxide was flashed and thus determined by the inlet pressure of liquefied carbon dioxide and by the size of the inlet orifice through which liquefied carbon dioxide was flashed). The following results were noted:

SNOW LOSS AND RESTRICTION

| Test | $P_t$ | $P_o$ | $P_b$ | Inlet Orifice Size | Snow Discharge Rate | Snow Velocity- Appearance |
|---|---|---|---|---|---|---|
| 1 | 297 | 290 | 4 | 0.157" | 9¾ lb./min. | Good Flake (Low Velocity) |
| 2 | 294 | 289 | 4¼ | 0.161" | 12 lb./min. | Excellent Flake (Low Velocity) |
| 3 | 292 | 287 | 4½ | 0.1695" | 14¼ lb./min. | Flake |
| 4 | 291 | 283 | 4¾ | 0.177" | 15 lb./min. | Flake (OK) |
| 5 | 290 | 286 | 5¼ | 0.182" | 15¾ lb./min. | Good Flake |
| 6 | 290 | 286 | 5¾ | 0.189" | 16½ lb./min. | Flake (OK) |
| 7 | 288 | 285 | 5¾ | 0.1935" | 18 lb./min. | Flake & Granular (Velocity up) |

$P_t$ = Tank (Source) Pressure (psig)
$P_o$ = Pressure at Inlet Orifice (psig)
$P_b$ = Back Pressure (psig)
NOTE: Granular particles appeared at snow discharge rates greater than approximately 16 lb./min.

From these results it has been noted that the appearance or disappearance of granular particles of carbon dioxide snow among flaky particles of carbon dioxide snow depended upon the rate at which liquefied carbon dioxide was flashed. Accordingly, it has been found that production of granular particles of carbon dioxide snow may be controlled by control of the rate at which liquefied carbon dioxide is flashed.

In the modification of FIG. 5, in which primed reference numbers are used to indicate parts similar to likenumbered parts in FIGS. 1–4 except as mentioned below, an enlarged orifice 54' opens radially inwardly and is located in the curved portion 50' of a tubular conduit 40'. A chamber 100, which has an outlet 102, is mounted to the tubular conduit 40' to receive carbon dioxide vapor from the orifice 54'. A tubular conduit 104 is connected to the chamber 100 for communication with the outlet 102. The blade 60' is elongated in cross-section, as shown, such that its leading edge 66' is extended a substantial distance into the tubular conduit 40'. Accordingly, while the concentrated stream of carbon dioxide snow and a minimum amount of carbon dioxide vapor are permitted to flow to the outlet end (not shown) of the tubular conduit 40', carbon dioxide vapor may be drawn off through the tubular conduit 104.

Where desired, a second apparatus similar to the apparatus 10 may be series-connected to the apparatus 10 with the inlet end of the second apparatus connected to the outlet end 46 of the apparatus 10. Also, where desired, carbon dioxide vapor recovered from the outlet end 46 of the apparatus 10 may be conducted in heat exchange relationship either to the conduits 16 and 18 or to the tubular conduit 40, or to both, whereby heat input from the ambient atmosphere may be reduced. Furthermore, the apparatus 10 may be operated for recovery of carbon dioxide vapor through the outlet end 46 at high pressures approaching the triple point pressure.

The tubular conduit 40 confines the flowing mixture of carbon dioxide snow and vapor and thus markedly reduces the sound level in the ambient atmosphere from the ordinarily objectionable sound level that would be reached if liquefied carbon dioxide were to be flashed into the ambient atmosphere. Similarly, withdrawal of carbon dioxide vapor from the outlet end 46, as through the tubular condiut 86 further reduces the sound level in the ambient atmosphere.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves from the aforesaid description and are intended to be encompassed within the scope of the appended claims.

I claim:

1. Method for separating carbon dioxide snow from a mixture of carbon dioxide snow and vapor comprising the steps of expanding liquid carbon dioxide to a pressure below the triple point to form carbon dioxide snow and vapor introducing a flowing mixture of carbon dioxide snow and vapor through one end of a tubular conduit curved to define a curvilinear flow path axially through the tubular conduit such that carbon dioxide snow tends to be concentrated in a stream flowing axially through the tubular conduit, deflecting the concentrated stream of carbon dioxide snow from the remainder of the mixture, and discharging the concentrated stream of carbon dioxide snow from the tubular conduit.

2. The method of claim 1 wherein the curvilinear flow path is arcuate.

3. The method of claim 2 wherein the curvilinear flow path extends over approximately from 90° to 180° of arc.

4. The method of claim 1 further comprising the step of flashing liquefied carbon dioxide to introduce the mixture of carbon dioxide snow and vapor into said end of the tubular conduit for flow of the mixture axially through the tubular conduit along the curvilinear flow path.

5. The method of claim 1 wherein liquefied carbon dioxide is flashed through a restricted flow path communicating with the curvilinear flow path.

6. The method of claim 1 wherein the steps are performed at a pressure above atmospheric pressure.

7. The method of claim 1 further comprising the step of applying back pressure to the curvilinear flow path.

8. The method of claim 6 wherein the steps are performed at a pressure which does not exceed 20 psig.

9. The method of claim 6 wherein the steps are performed at a pressure which does not exceed 10 psig.

10. The method of claim 6 wherein the steps are performed at a pressure which does not exceed 7 psig.

11. The method of claim 7 wherein the remainder of the mixture flows through a restricted flow path communicating with the curvilinear flow path.

12. The method of claim 1 wherein the concentrated stream of carbon dioxide snow is deflected for flow along a flow path intersecting the curvilinear flow path.

13. The method of claim 12 wherein the concentrated stream of carbon dioxide snow is deflected for flow radially outwardly through an opening in the lateral wall of the tubular conduit.

14. The method of claim 12 further comprising the step of flashing liquefied carbon dioxide at a controlled rate to introduce a mixture of carbon dioxide snow and vapor into the curvilinear flow path and to control production of granular particles of carbon dioxide snow for flow in the flow path intersecting the curvilinear flow path.

15. The method of claim 14 further comprising the step of reducing the rate at which liquefied carbon dioxide is flashed to retard production of granular particles of carbon dioxide snow for flow in the flow path intersecting the curvilinear flow path.

16. The method of claim 14 further comprising the step of increasing the rate at which liquefied carbon dioxide is flashed to promote production of granular particles of carbon dioxide snow for flow in the flow path intersecting the curvilinear flow path.

* * * * *